United States Patent [19]

Kammerl

[11] Patent Number: 4,776,002
[45] Date of Patent: Oct. 4, 1988

[54] METHOD FOR PROMPTING AT A DIGITAL TELEPHONE STATION

[75] Inventor: Anton Kammerl, Groebenzell, Fed. Rep. of Germany

[73] Assignee: Siemens Aktiengesellschaft, Berlin & Munich, Fed. Rep. of Germany

[21] Appl. No.: 62,671

[22] Filed: Jun. 16, 1987

[30] Foreign Application Priority Data

Jun. 23, 1986 [DE] Fed. Rep. of Germany ....... 3620923

[51] Int. Cl.$^4$ .............................................. H04M 1/64
[52] U.S. Cl. ...................... 379/88; 379/100; 379/387; 379/396
[58] Field of Search ................ 379/201, 88, 100, 354, 379/387, 368, 216

[56] References Cited

U.S. PATENT DOCUMENTS 4,375,083 2/1983 Maxemchuk .................... 379/88 X

OTHER PUBLICATIONS

Robert Bloeden et al., "Touchphone: A New Generation in Telephone Design", Telesis 1985, 2nd Quarter, pp. 21-25.

Russell Hsing et al., "An Interactive Touch Phone for Office Automation", IEEE Communications Magazine, Feb. 1985, pp. 21-26.

David Scott, "Touch-Screen Communicator", Popular Science, Apr. 1983, p. 103.

Primary Examiner—James L. Dwyer
Attorney, Agent, or Firm—Hill, Van Santen, Steadman & Simpson

[57] ABSTRACT

The present invention is directed to a method for user prompting at a digital telephone station, comprising a twelve-key keyboard for subscriber selection and further keys, here eight, for subscriber services, and comprising a display for written or oral messages deposited in a mailbox assigned to the telephone station an a one-line or multi-line display, and whereby at least a portion of the keys can be represented on a touch sensitive liquid crystal surface in the form of pictograms.

10 Claims, 1 Drawing Sheet

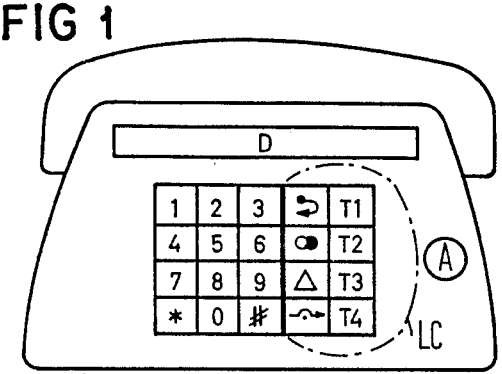

METHOD FOR PROMPTING AT A DIGITAL TELEPHONE STATION

CROSS REFERENCE TO RELATED APPLICATION

This application is related to application Ser. No. 07/052,273, filed May. 21, 1987.

BACKGROUND OF THE INVENTION

1. Field of the Invention

The present invention is directed to a method for user prompting at a digital telephone station, comprising a twelve-key keyboard for subscriber selection and further keys, here eight, for subscriber services, and comprising a display for written or oral messages deposited in a mailbox assigned to the telephone station and a one-line or multi-line display, and whereby at least a portion of the keys can be represented on a touch-sensitive liquid crystal surface in the form of pictograms.

2. Description of the Prior Art

In modern telephone systems, the individual subscriber services are gaining more and more significance. Given the multitude of subscriber services, a user prompting has proven absolutely necessary and it has also been shown that many subscriber services are only accepted by the using person when the user prompting was appropriately simple and easy to understand. It is notoriously known to undertake this prompting either by speech by way of telephone or in writing by way of a display. Voice prompting, however, is rather time-consuming; prompting in writing is relatively involved and both promptings are bound to the respective national language or writing.

The structure which leads to the solution of the following object are partially known. For example, the German published application No. 34 09 532 A1 discloses that a touch-sensitive liquid crystal surface (LC surface) be provided at a telephone station, this showing the selection keyboard as a pictogram when the handset is lifted and allowing a subscriber dialing by touching the individual key regions with an electric stylus.

Moreover, the LC surface can be at least partially used for the transmission of printing and drawing after the selection of a corresponding operating mode. However, a solution of the present object is not disclosed.

SUMMARY OF THE INVENTION

The object of the present invention, therefore, is to provide a prompting, particularly for subscriber service "mailbox", for the above telephone stations which is fast and easy to understand and can be internationally used and which, moreover, can be realized given the space offering of a standard, normal telephone set.

The above object is achieved, according to the present invention, in that the further or additional (here 8) keys are formed by an interconnected, touch-sensitive liquid crystal display surface (LC) which is divided into eight function regions, whereby each function region displays a pictogram indicating the respective subscriber service. Upon actuation of the display (A), all pictograms for subscriber services disappear and a request for the selection of the mailbox code number (CN) appears over the entire LC surface. After code number selection, pictograms appear in the corresponding function regions instead of the request, these pictograms requesting an operator selection of transmitting or receiving oral or written messages into or out of the mailbox. Upon touching a function region for transmitting, only the corresponding pictogram remains visible and indicates the readiness of the station to send. Upon touching a pictogram in the function region for receiving, only pictograms which indicate the plurality of existing messages are visible. When touching the corresponding pictogram, the senders of the messages are successively transmitted by way of the handset or the display (D), whereby a numeral respectively indicating the sequence of the messages appears. Given another touch of the pictogram, the message corresponding to the numeral just displayed is connected through.

Deriving therefrom is the advantage that eight keys for arbitrary subscriber services can be visually and functionally simulated on a relatively small area. Given selection of a further subscriber service, for example the input or removal of a written or spoken message into or out of a mailbox, the same space provided for the aforementioned eight keys can be employed for the utilization and prompting with internationally understandable characters (pictograms), whereby the representation of pictograms and the change of these pictograms on touch-sensitive LC surfaces are known per se.

A further feature of the invention is that the initialization of the LC surface does not occur until the handset is lifted of until a release key is actuated.

A significant power saving therefore derives at the telephone sits fed by way of the subscriber line.

A further feature of the method of the invention is that, during playback of a message, function regions on the LC surface show pictograms as indications for complete or partial rewind of the message or for complete or partial fast-foward when touched.

Deriving therefrom is the advantage that messages taken from the mailbox can be partially or entirely repeated or that they can be partially or entirely run through due to lack of interest

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 illustrates a telephone station comprising a twelve-part keyboard for selecting a subscriber and an eight-part keyboard for realizing subscriber services, the keys of the eight-part keyboard being composed of pictograms on a touch-sensitive liquid crystal surface, and the telephone station comprise a display D and an indicator (key A+ luminescent display) for messages deposited in the mailbox;

FIGS. 2-6 illustrate the pictograms of the LC surface upon removal of a message from the mailbox belonging to the subscriber;

FIG. 7 illustrates the pictograms on the LC surface for further processing of the played back or read message; and FIG. 8 illustrate a pictogram on the LC surface which indicate the manner for further removal of messages from the mailbox.

DESCRIPTION OF THE PREFERRED EMBODIMENTS

The digital telephone station of FIG. 1 involves a station comprising a one-line or a multi-line display D, a twelve-key selection keyboard composed of the dial keys 0–9 and of two special keys * and #, and comprises a LC surface LC which shows the pictograms for eight further keys for subscriber services when the handset is lifted. The LC surface is touch-sensitive and the corresponding subscriber service is carried out or initiated when the function regions of the pictograms are touched. In the present example, the subscriber services are composed of "repeat dialing", "call rerouting", "three-party conference", "call forwarding" and of four direct dialing possibilities of the subscribers T1–T4.

The control of the individual function regions of the LC surface occurs from the telephone system by way of the signal leads of the subscriber line or the function regions or controlled via a microprocessor with the assistance of processed programs permanently stored in the telephone station.

The telephone station further comprises a display A. The display A is conceived of as a key and lights up when a message for the telephone station is stored in the mailbox arranged in the telephone system and assigned to the telephone station. The stored message can thereby be present in written form and in oral form.

The removal of a message from the mailbox with the assistance of the prompting by the pictogram shall be set forth first.

When the subscriber sees that the telephone station, based on the lighting of the indicator A, that a message is present for him and when he wishes to see or hear this message, then he presses the indicator which is constructed as a key, after he has lifted the handset. The eight pictograms appearing first for the first eight subscriber services disappear and an arrow in the direction of the selection keyboard having, for example, the instruction "M" appears on the full LC surface. This requests the subscriber to dial his own assigned code number so that the telephone station can be connected to the memory unit of the mailbox assigned thereto (FIG. 2).

When the code number has been selected, then four pictograms (FIG. 3) appear in four function regions of the LC surface. One pictogram illustrates an handset with an arrow from the telephone. When one wishes to listen to an oral message, this function region must be touched. A second function region shows a handset with an arrow to the microphone. This function region must be touched when depositing a spoken message. A third function region shows a stylized letter with an arrow pointing to the station. This function region must be touched in order to achieve the prompting for reading a stored message by way of the display D. The fourth function region shows a stylized letter having an arrow leading out of the station. This region must be touched when a written message is to be deposited into the mailbox. This, however, is only possible with telephone stations plus keyboard and circuity that are suitable for compiling and sending a text, as disclosed in the German published application No. 33 07 368 A1, fully incorporated herein by this reference.

When, given the display pictogram, one or more written messages are present, then the pictogram comprising letter and arrow will flash in the station. When one or more oral messages are present, then the pictogram comprising handset and the arrow leading from the telephone will flash. It will here be assumed that an oral message is present and that this is to be heard. The subscriber therefore touches the pictogram for listening to an oral message and the pictograms of FIG. 3 are now quenched and two new pictograms appear in function regions of identical size in accordance with FIG. 4. A type of pot is selected as such a pictogram character, whereby one pot is drawn with heavier lines than the other. The pot drawn with heavier lines contains a number which states how many oral messages were deposited in a definable time that just elapsed a short time before. The second pictogram, for example, is a pot drawn with thinner lines which can likewise contain a number which states how many messages stored for a longer time is present. It is also assumed that the subscriber wishes to listen to the more recent messages. He will therefore place his finger on the function region for the pictogram for the more recent messages. The pictogram for the older messages disappears and, given the presence of a plurality of more recent messages, the numbers of the individual messages additionally successively appear in the function region and the addresses the corresponding senders additionally appear on the display (FIG. 5). When the subscriber removes his finger, for example at the number 3 (third message), then a combined pictogram in accordance with FIG. 6 appears. The function region having the pot for more recent messages remains and continues to show how many messages are present and also shows which message can now be heard by way of a handset given another slight touch of the function region having the number of existing messages. Pictograms which indicate the function regions for further subscriber services relating to listening now appear. These subscriber services are:

(1) Rewind the message, 10 seconds;
(2) Fast forward the message, 10 seconds;
(3) Entirely rewind the message;
(4) Have the message entirely run through; and
(5) Stop the message or, respectively, let it run, all of which are illustrated in FIG. 6.

When the message has been completely run through, then a new combined pictogram, in accordance with FIG. 7, appears at the end thereof.

The function region comprising the container having the number of new messages up to the present continues to remain. The pictograms relating to the run of the message have disappeared. New pictograms indicate the function regions which, when touched, allow the message which has just been heard to be either (1) erased, or
(2) stored, or
(3) forwarded, or
(4) directly answered by inputting the message into the mailbox of the sender of the message heard by the subscriber (FIG. 6).

If one wishes to carry out yet further functions, then a function region for a "function expansion key" is provided for this purpose. (FIG. 7 broken lines).

When this latter pictogram has been worked off, then a new combination of pictograms appears. It shows the function regions for the container having the most recent messages comprising a number reduced by one message, shows the container for the earlier messages, shows the handset with the arrow to the microphone and for taking or, respectively, for inputting the written messages (FIG. 8). The subscriber can now either select again or, respectively, interrupt the interrogation or input of messages in that he actuates the indicator device A. This indicator device can also be actuated when it is not lit, namely when depositing messages into the mailbox of other subscribers.

In accordance with the method set forth above, which is not limited only to the "mailbox" process, the prompting for subscriber services at a digital telephone station has been disclosed which, on the basis of its pictorial instructions, is easy and rapid for the user to understand, this being independent of a language and, therefore, international and, other than noting the code number, making no further burdens such as, for example, noting numbers or combining numbers given subscriber services, etc, necessary.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for prompting at a digital telephone station which comprises a multi-keyboard for subscriber dialing, and additional keys for subscriber services, an indicator for messages deposited in a mailbox assigned to the telephone station, and at least a line display, and whereby at least a portion of the keys are representable on a touch-sensitive liquid crystal surface in the form of pictograms, comprising the steps of:

dividing the liquid crystal surface into a plurality of functional regions, in which each functional region displays a pictogram indicating the respective subscriber service;

upon actuation of the indicator, causing all pictograms for subscriber services to disappear and a request for dialing the mailbox code to appear over the entire liquid crystal surface;

dialing a code number and, after dialing a code number, replacing the request in the corresponding functional regions by pictograms which request an operator selection of transmitting or receiving messages into or out of the mailbox;

in response to touching a functional region for transmitting, causing only the corresponding pictogram to remain visible and indicating the readiness of the station to transmit;

in response to touching a functional region for receiving a message, generating only pictograms which indicate the plurality of existing messages;

in response to touching one of the existing message pictograms transmitting the messages successively through via the telephone station and generating a numeral indicating the respective sequence of messages additionally available as a pictogram; and in response to touching the pictogram again, connecting through the message corresponding to the numeral just displayed.

2. The method of claim 1, and further comprising the step of:
controlling the functional regions by way of control leads from the telephone station.

3. The method of claim 1, and further comprising the step of:
controlling the functional regions by way of memories in the telephone station.

4. The method of claim 1, and further comprising the step of:
initializing the liquid crystal surface in response to actuation of a switch.

5. The method of claim 1, and further defined as:
selecting the receiving mode for messages; and
generating numbers on two function regions for indicating the number of existing messages which arrived on the basis of a more recent or earlier date.

6. The method of claim 1, and further comprising the step of:
while in the receiving mode, generating pictograms as indications for at least partial rewind of a message or partial fast forward and in response to touching the liquid crystal surface functional regions providing for partial rewind or partial fast forward, respectively.

7. The method of claim 6, wherein:
at the end of a message, terminating the pictogram for fast forward or rewind and generating pictograms in the functional regions for carrying out any erasing, forwarding or storing of a direct response.

8. The method of claim 7, and further comprising the step of:
generating pictograms on the functional regions indicating the number of messages present and enabling a modification of the operating mode when touched.

9. The method of claim 1, wherein the step of requesting for operator selection of transmitting or receiving messages into or out of the mailbox includes the step of:
flashing corresponding pictograms when messages have been received by connecting through a code number.

10. The method of claim 1, and further comprising the steps of repeatedly actuating the indicator to extinguish the mailbox pictograms.

* * * * *